Jan. 21, 1958　　　T. G. MALONEY ET AL　　　2,820,230
MACHINE FOR CASING-IN BOOKS
Filed Jan. 27, 1956　　　　　　　　　　　　　4 Sheets-Sheet 1
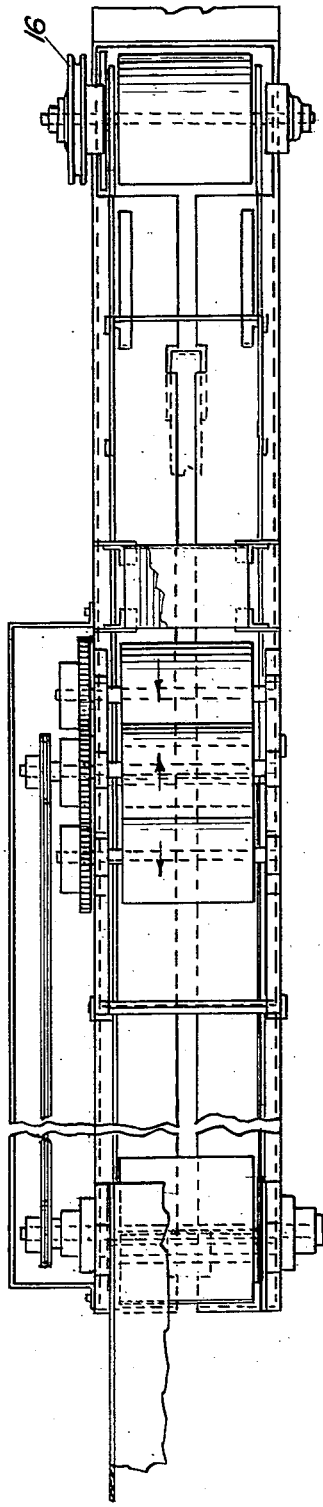
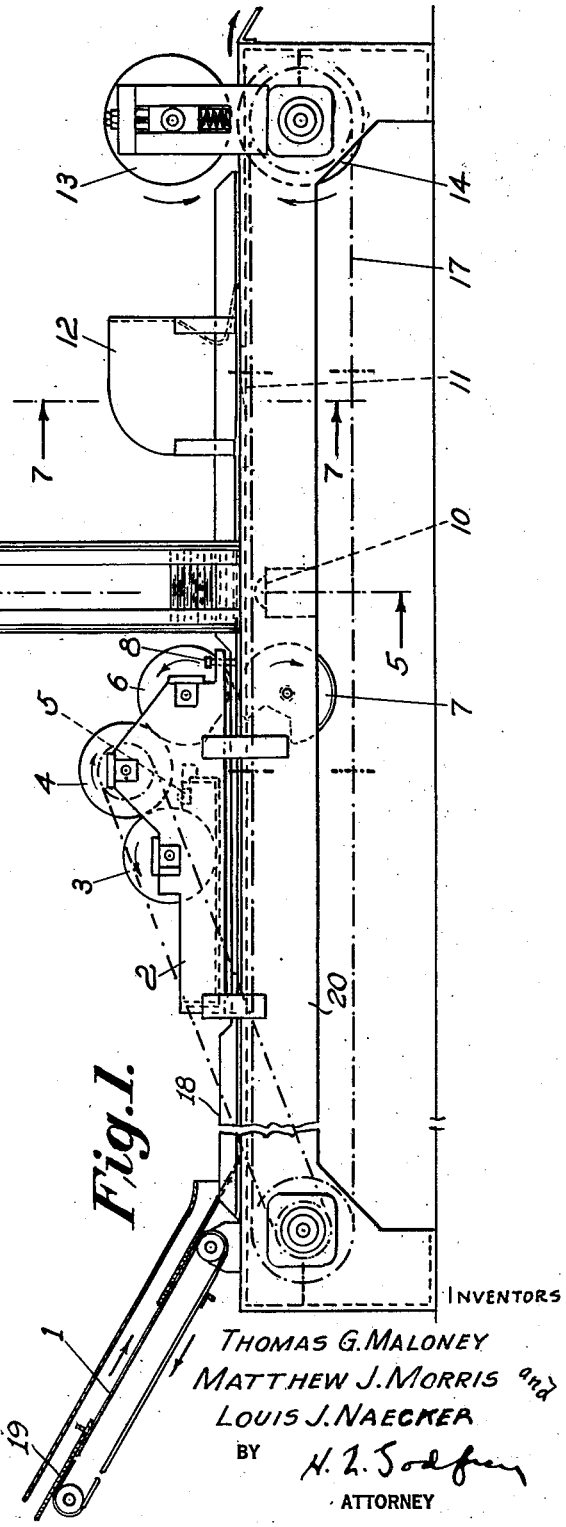
INVENTORS
THOMAS G. MALONEY
MATTHEW J. MORRIS and
LOUIS J. NAECKER
BY
ATTORNEY Jan. 21, 1958
T. G. MALONEY ET AL
2,820,230
MACHINE FOR CASING-IN BOOKS
Filed Jan. 27, 1956
4 Sheets-Sheet 2
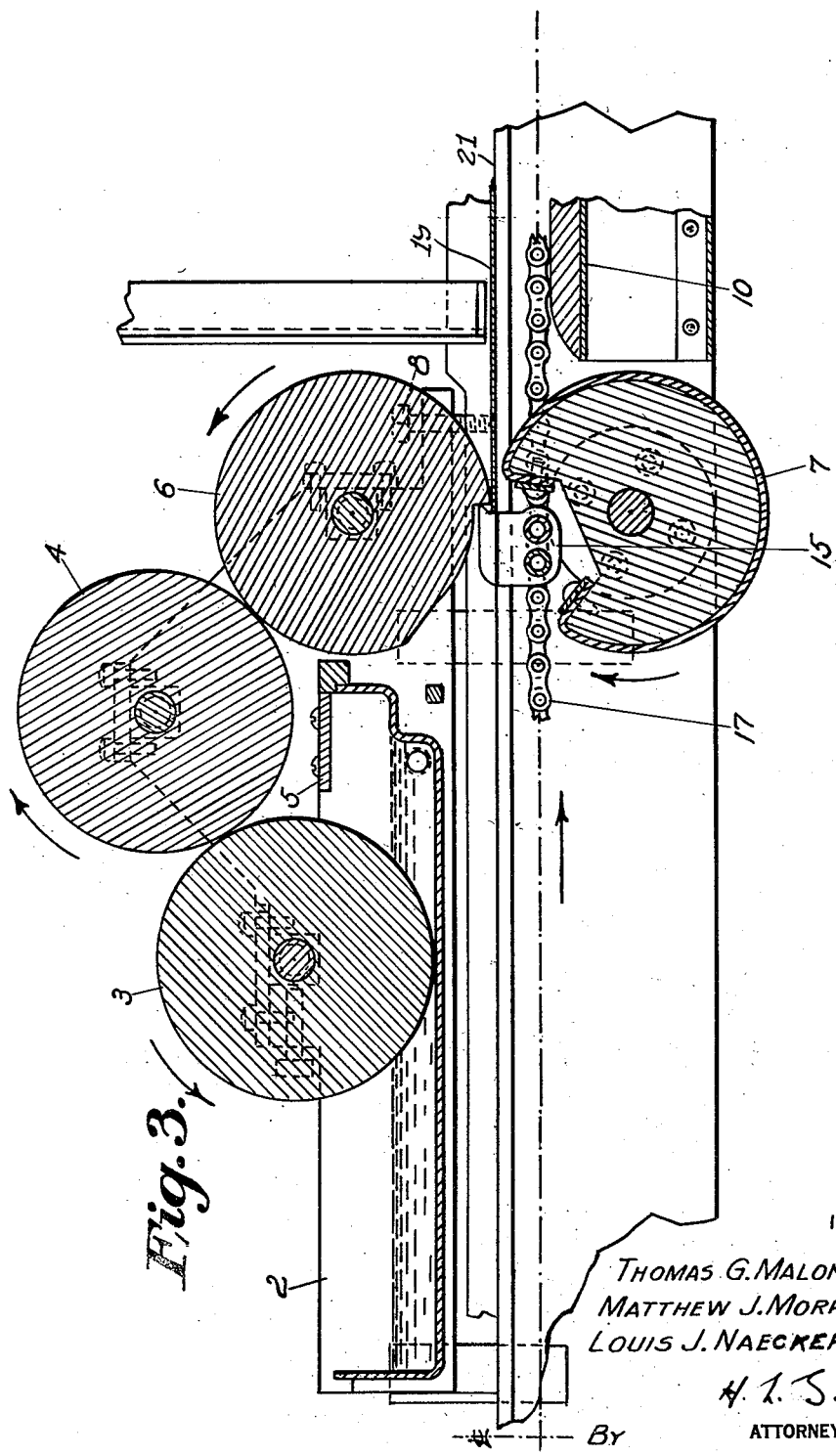
INVENTORS
THOMAS G. MALONEY
MATTHEW J. MORRIS and
LOUIS J. NAECKER
By
ATTORNEY Jan. 21, 1958
T. G. MALONEY ET AL
2,820,230
MACHINE FOR CASING-IN BOOKS
Filed Jan. 27, 1956
4 Sheets-Sheet 3
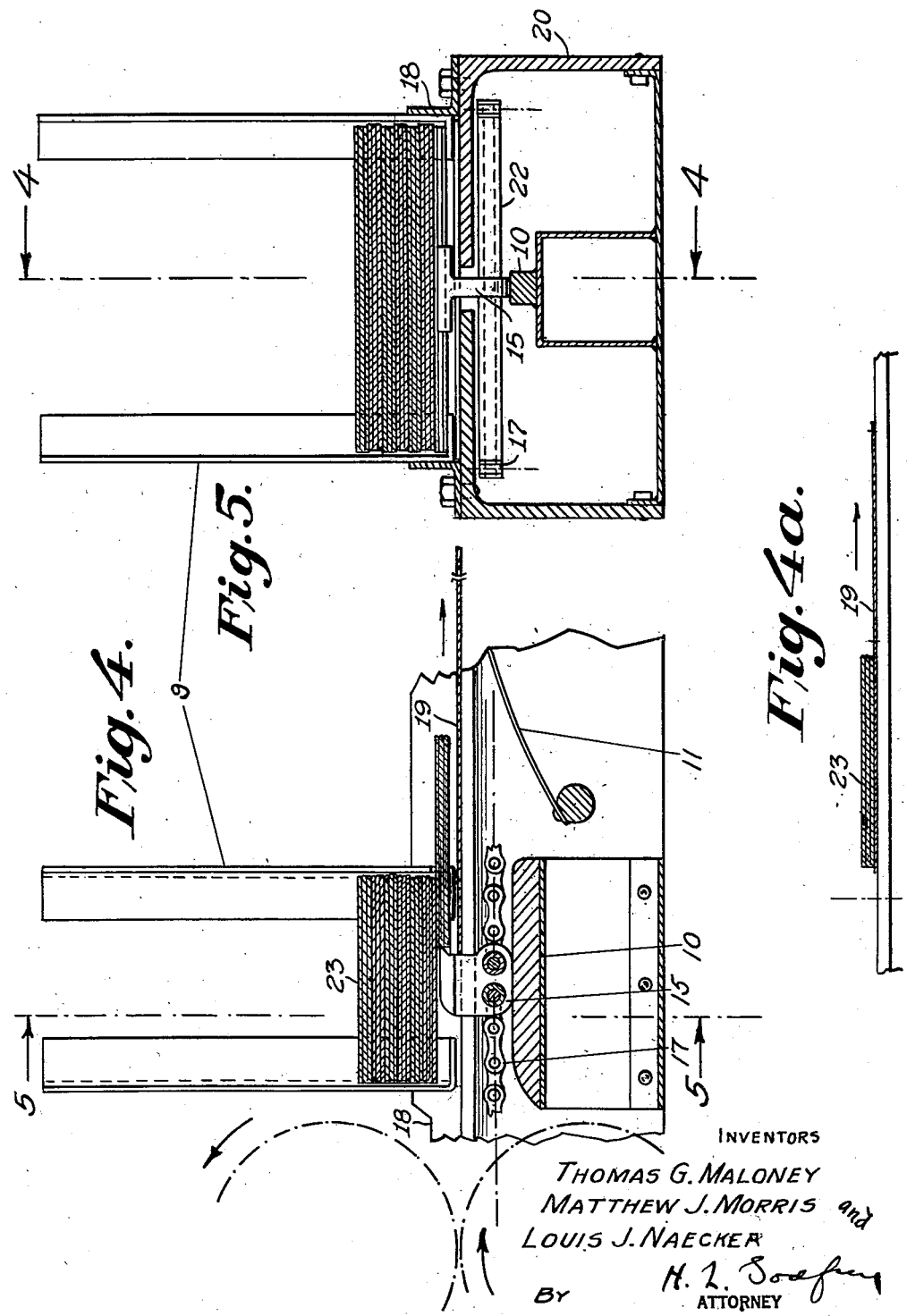
INVENTORS
THOMAS G. MALONEY
MATTHEW J. MORRIS and
LOUIS J. NAECKER
BY
ATTORNEY Jan. 21, 1958   T. G. MALONEY ET AL   2,820,230
MACHINE FOR CASING-IN BOOKS
Filed Jan. 27, 1956   4 Sheets-Sheet 4
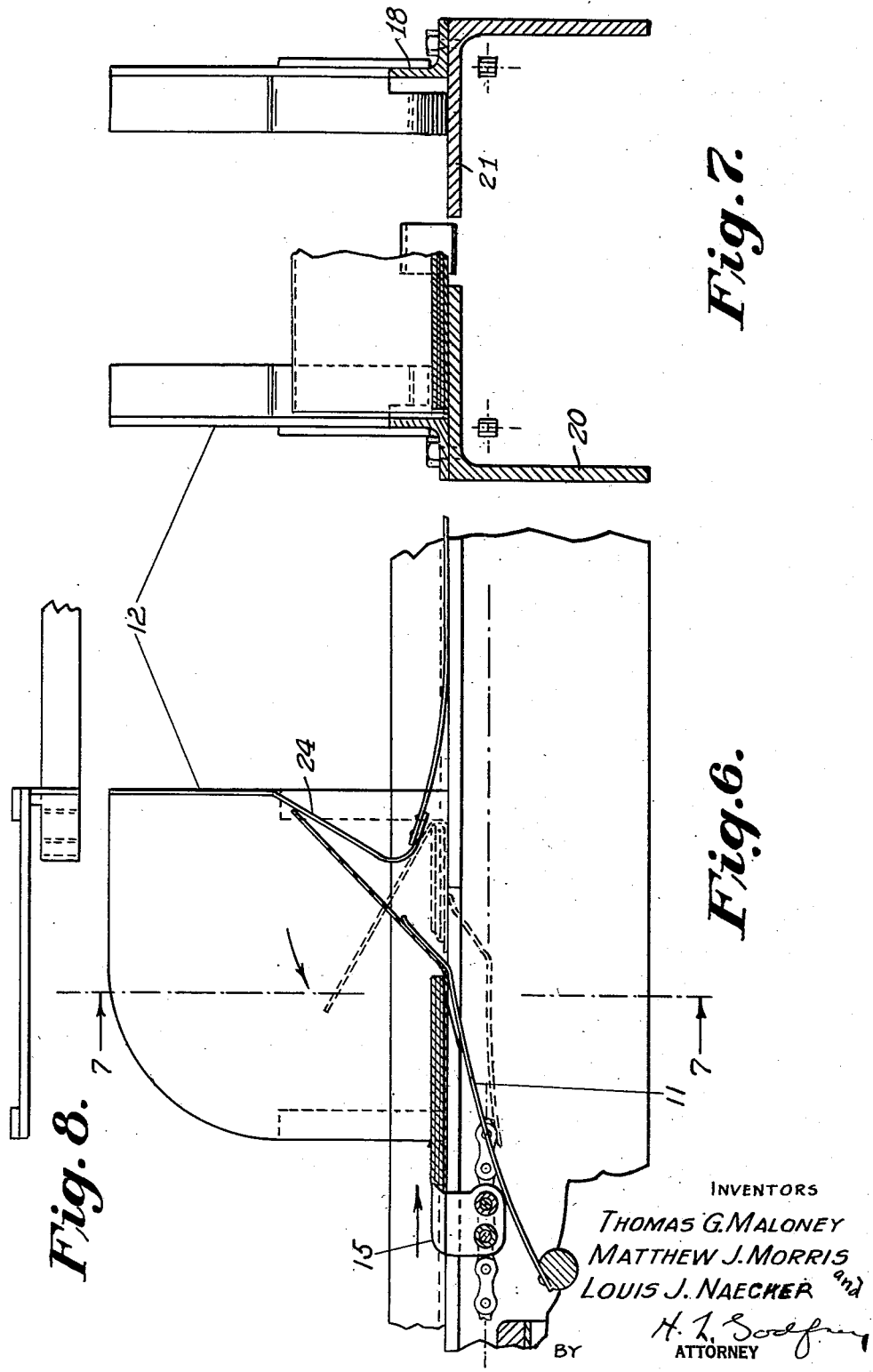
INVENTORS
THOMAS G. MALONEY
MATTHEW J. MORRIS
LOUIS J. NAECKER
BY
ATTORNEY

United States Patent Office 2,820,230
Patented Jan. 21, 1958

2,820,230

MACHINE FOR CASING-IN BOOKS

Thomas G. Maloney and Mathew J. Morris, Washington, D. C., and Louis J. Naecker, Silver Spring, Md.

Application January 27, 1956, Serial No. 561,959

3 Claims. (Cl. 11—4)

(Granted under Title 35, U. S. Code (1952), sec. 266)

The invention described herein may be manufactured and used by or for the Government of the United States for governmental purposes without the payment to us of any royalty thereon in accordance with the provisions of the Act of April 30, 1928 (Ch. 460, 45 Stat. L. 467).

This invention relates to a machine for casing-in books, and more particularly to a machine for rapidly applying a cover on books without-a-joint as known in the bookbinding trade.

Presently known machines for casing-in books move the fillers, i. e., assembled signatures forming the matter to be bound, between upper and lower paste rollers, and into a preformed cover. The completed unit is then subjected to pressure, usually between a set of rollers, and then ejected from the machine. Such a machine is described in United States Patent 2,549,890.

The main object of this invention is to simplify presently known machines of this type, to thereby reduce the cost of the completed book.

A secondary object of this invention is to eliminate the necessity of a preformed cover, thereby reducing the amount of supervision of the machine.

The foregoing and related objects hereinafter apparent are accomplished by this invention, wherein the machine for casing-in books comprises a conveyor or other suitable means for delivering the open book covers to an advancing mechanism which moves the covers onto a runway where they are conveyed under a paste roller which applies paste to the top side of the cover. The pasted cover is advanced to the filler magazine or hopper where the book is fed onto the cover. Then the cover is turned over onto the book and the completed book is passed between pressure rollers and ejected.

Other and further objects and advantages of the invention will become more apparent from the following description, reference being had to the accompanying drawings, in which:

Fig. 1 is a longitudinal view in elevation;

Fig. 2 is a plan view;

Fig. 3 is a detailed sectional elevation view of the paste pot and roller assembly;

Fig. 4 is a detailed sectional elevation view of the filler hopper assembly;

Fig. 4a is a diagrammatic view of the cover and filler after it leaves the hopper of Fig. 4;

Fig. 5 is a sectional view taken along line 5—5 of Fig. 4 and looking in the direction of the arrows;

Fig. 6 is a detail sectional elevation view of the cover turn-over assembly;

Fig. 7 is a sectional view taken along line 7—7 of Figs. 1 and 6 and looking in the direction of the arrows; and Fig. 8 is a fragmentary view showing the construction of the turn-over assembly.

Referring now to the drawings, and more particularly to Fig. 1, a base frame 20 is provided which may be of any desired design, but preferably has upstanding portions 18 as more clearly shown in Figs. 5 and 7 to provide a runway along the upper surface of the frame. Positioned along the runway are the standard conveyor 1 for delivering the covers 19 to the runway, a paste pot 2 and associated rollers, a filler or insert hopper 9, a turn-over assembly 12 and the pressure rollers 13, 14. A chain drive shown by the dot-dash line 17 of Fig. 1, and more detailed in Figs. 3 and 4, is connected between the pulleys at the ends of the frame 20, and it is provided with pusher fingers 15 spaced therealong to advance the covers along the runway.

The paste pot and roller assembly are shown in greater detail in Fig. 3. A paste pot 2 is positioned above the floor 21 of the runway and contains a supply of paste or suitable adhesive. A screw 8 is provided for adjustment of the paste pot. Paste roller 3 picks up the paste and transfers it to the paste transfer roller 4, from which the paste is applied to the paste application roller 6. The paste impression roller 7, which preferably has a rubber blanket cover, is positioned just below the application roller 6 and makes rolling contact with the under side of a cover through a struck-out portion of the runway floor. A paste roller scraper 5 is also provided for obvious reasons.

As shown in Figs. 3, 4 and 5, each of the pusher fingers 15 is attached between the pair of parallel chain drives 17 by means of the rods 22 of Fig. 5. The fingers 15 are equally spaced along the chain and push the cover 19 along the runway past each of the separate stations. Roller 7 has a portion of the periphery removed to permit passage of the fingers 15. As shown in Fig. 3, the pusher finger has advanced a cover 19 to the point where it is just clearing the application roller 6, and entering the filler hopper 9 which will now be described by reference to Fig. 4.

The book filler hopper 9 has four upright corner members which are adjusted to accommodate the particular fillers or inserts. Directly beneath the hopper 9 is a pusher finger cam 10 which is positioned so that, as the advancing cover 19 passes beneath the hopper 9, the pusher finger 15 will ride upon the cam surface and project up into the hopper to remove the bottom filler, as shown in Figs. 4 and 5.

The next station in the advancing path of the cover and filler is the cover-turn-over-assembly shown in Figs. 6 and 7. The assembly is shown as comprising a pair of upright wall members having a pair of cover guide portions 24 which are bent inwardly as shown in Fig. 6. The assembly also comprises a book-cover-turn-over spring 11, which lies in path of the advancing cover, and is moved out of said path by the pusher finger 15 as it advances along the runway.

The final station is shown in Fig. 1 as the two pressure rollers 13 and 14. The upper roller 13 is preferably of the adjustable bearing block type as shown.

In operation, the open book cover is delivered automatically to the runway by the conveyor 1. The pusher fingers 15 advance the covers one by one between the rollers 6 and 7 of the paste assembly where the adhesive is applied to the upper surface of the cover. The rollers 3, 4, 6 and 7 are geared together and driven in synchronism with the pusher-finger chain 17, so that a book cover arrives at the paste rollers at the proper time and further so that the pusher-finger coincides with the open section of the roller 7.

As the pasted cover is advanced beneath the filler hopper 9, the pusher-finger 15 is raised by the cam 10 and the bottom book filler is removed and aligned with the following edge of the cover. Next, the leading edge of the cover strikes the upturned end of spring 11, which causes the edge of the cover to be raised, and strikes the bent portion 24 of the turn-over assembly 12. As the cover and filler advance, the pusher-finger 15 rides up onto the spring 11, depressing the spring and moves the raised cover against the bent portion, which results in the cover being folded back onto the filler, as shown in phantom in Fig. 6.

The book cover and filler now pass between pressure rollers 13, 14, and the finished unit is ejected as a complete cased-in book.

Since many apparently differing embodiments of this invention will occur to one skilled in the art, it is obvious that various changes can be made in the specific details shown and described without departing from the spirit and scope of this invention.

What is claimed is:

1. In a machine for casing-in books without a joint, comprising a runway, book cover feeder means for feeding book covers into said runway, pusher finger means mounted on an endless drive means for moving said covers along said runway, a paste station located on said runway and adapted to apply paste to the upper surface of said cover, a filler hopper for depositing book fillers, aligned with the trailing edge of said covers, cover turn-over means located in the path of the moving covers for turning over the leading edge of said cover onto the deposited fillers, and presser means for applying pressure to the covered book and for releasing said book as a completed, cased-in book.

2. In a machine for casing-in books without a joint, comprising a runway having a plurality of spaced stations, means for depositing open book covers at one end of said runway, means for moving said cover along said runway, pasting means at a first station for applying paste to the upper surface of said cover, means at a second station for depositing book fillers adjacent one end of said cover, means at a third station for turning over the other end of said cover onto said filler, means at a fourth station for pressing said book cover and filler, and means for releasing said book as a complete cased-in book.

3. In a machine for casing-in books comprising a runway, a book filler hopper mounted on said runway, means for advancing open book covers along said runway, means for applying an adhesive to the upper surface of said book covers, means including said first-mentioned means for removing the bottom filler from said hopper and aligning said filler with the trailing edge of said cover, means for turning over the leading edge of said cover onto said filler, and means for applying pressure to the assembled book.

References Cited in the file of this patent

UNITED STATES PATENTS

| | | |
|---|---|---|
| 2,018,432 | Ackley | Oct. 22, 1935 |
| 2,549,890 | Burls | Apr. 24, 1951 |